(12) United States Patent
Hall

(10) Patent No.: US 8,356,418 B1
(45) Date of Patent: Jan. 22, 2013

(54) SPEED/AGILITY/QUICKNESS (SAQ) SKILL MEASUREMENT SET-UP ASSISTANT

(76) Inventor: Bruce Hall, Gaithersburg, MD (US)

( * ) Notice: Subject to any disclaimer, the term of this patent is extended or adjusted under 35 U.S.C. 154(b) by 39 days.

(21) Appl. No.: 13/135,863

(22) Filed: Jul. 16, 2011

(51) Int. Cl.
  *G01B 3/10* (2006.01)
  *A63B 71/02* (2006.01)
  *A63C 19/06* (2006.01)

(52) U.S. Cl. .......................................... 33/701; 33/761
(58) Field of Classification Search ............ 33/701, 33/759, 761, 769, 771
See application file for complete search history.

(56) References Cited

U.S. PATENT DOCUMENTS

| | | | |
|---|---|---|---|
| 4,164,334 A * | 8/1979 | Rathbun et al. | 33/761 |
| 4,189,107 A * | 2/1980 | Quenot et al. | 33/761 |
| 4,381,607 A | 5/1983 | Place | |
| 4,880,232 A | 11/1989 | Lang | |
| 4,978,121 A | 12/1990 | Larkey | |
| 5,371,949 A * | 12/1994 | Delaurier | 33/755 |
| 6,012,228 A * | 1/2000 | Fisanich | 33/759 |
| 6,357,133 B1 * | 3/2002 | Hsu | 33/755 |
| 6,430,819 B1 | 8/2002 | Aldsdat et al. | |
| 6,464,160 B2 * | 10/2002 | Hsu | 33/761 |
| 6,477,785 B1 * | 11/2002 | Hsu | 33/761 |
| 6,782,118 B2 | 8/2004 | Verga | |
| 6,893,365 B2 * | 5/2005 | Rathbun et al. | 33/759 |
| 7,260,899 B2 * | 8/2007 | Jones | 33/760 |
| 7,415,778 B1 * | 8/2008 | McEwan et al. | 33/761 |
| 7,555,843 B2 | 7/2009 | Leonard | |
| 7,591,081 B2 | 9/2009 | Sentz | |
| 7,600,327 B2 * | 10/2009 | Sharp | 33/769 |
| 7,731,611 B2 | 6/2010 | Contreras | |
| 7,870,679 B2 | 1/2011 | Lee et al. | |
| 7,896,758 B2 | 3/2011 | Luby et al. | |
| 2003/0014878 A1 * | 1/2003 | Smith | 33/759 |
| 2004/0029655 A1 | 2/2004 | Rathbun et al. | |
| 2008/0010849 A1 * | 1/2008 | Lee | 33/767 |
| 2009/0090015 A1 * | 4/2009 | Huang | 33/761 |
| 2009/0217541 A1 | 9/2009 | Lee et al. | |
| 2011/0232119 A1 * | 9/2011 | Smalls | 33/701 |

* cited by examiner

*Primary Examiner* — Yaritza Guadalupe-McCall

(57) ABSTRACT

This invention relates to a system and method for measuring a plurality of skills of an athlete, wherein the system is comprised of: a means for discharging and collecting a distance measuring means; a distance measuring means for measuring a distance to be used in measuring a desired athletic skill, wherein the distance measuring means further comprises a plurality of incremental markings substantially located along a length of the distance measuring means; and a securing means operatively connected to one end of the distance measuring means for securing the distance measuring means.

16 Claims, 5 Drawing Sheets

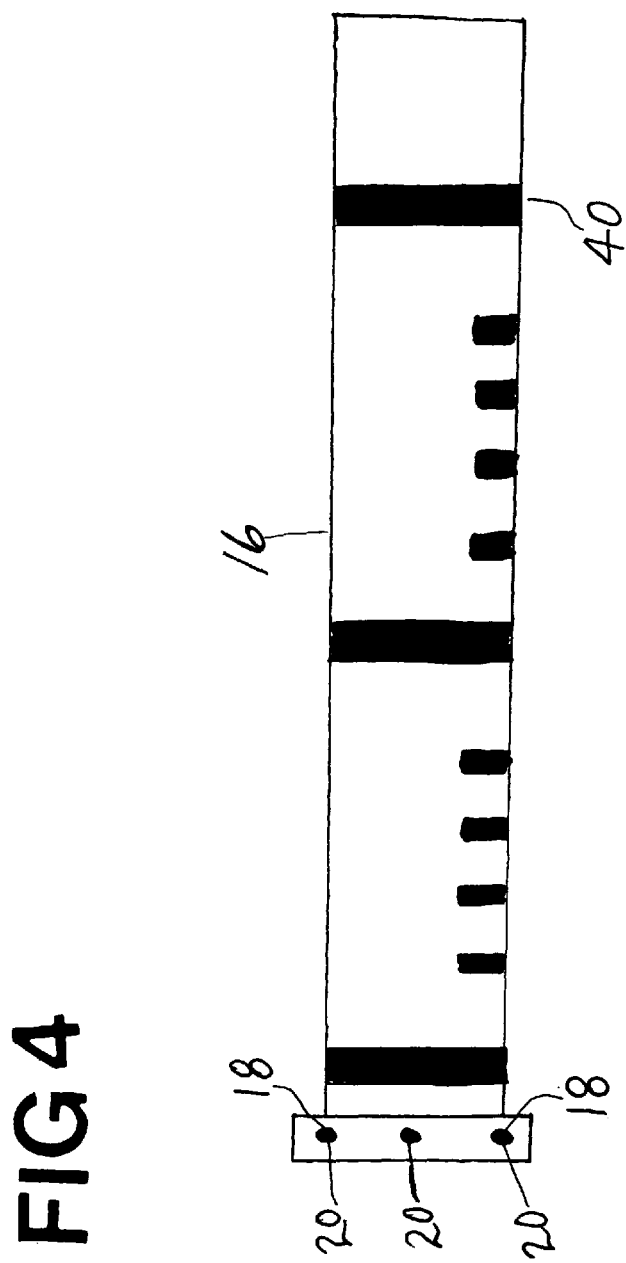

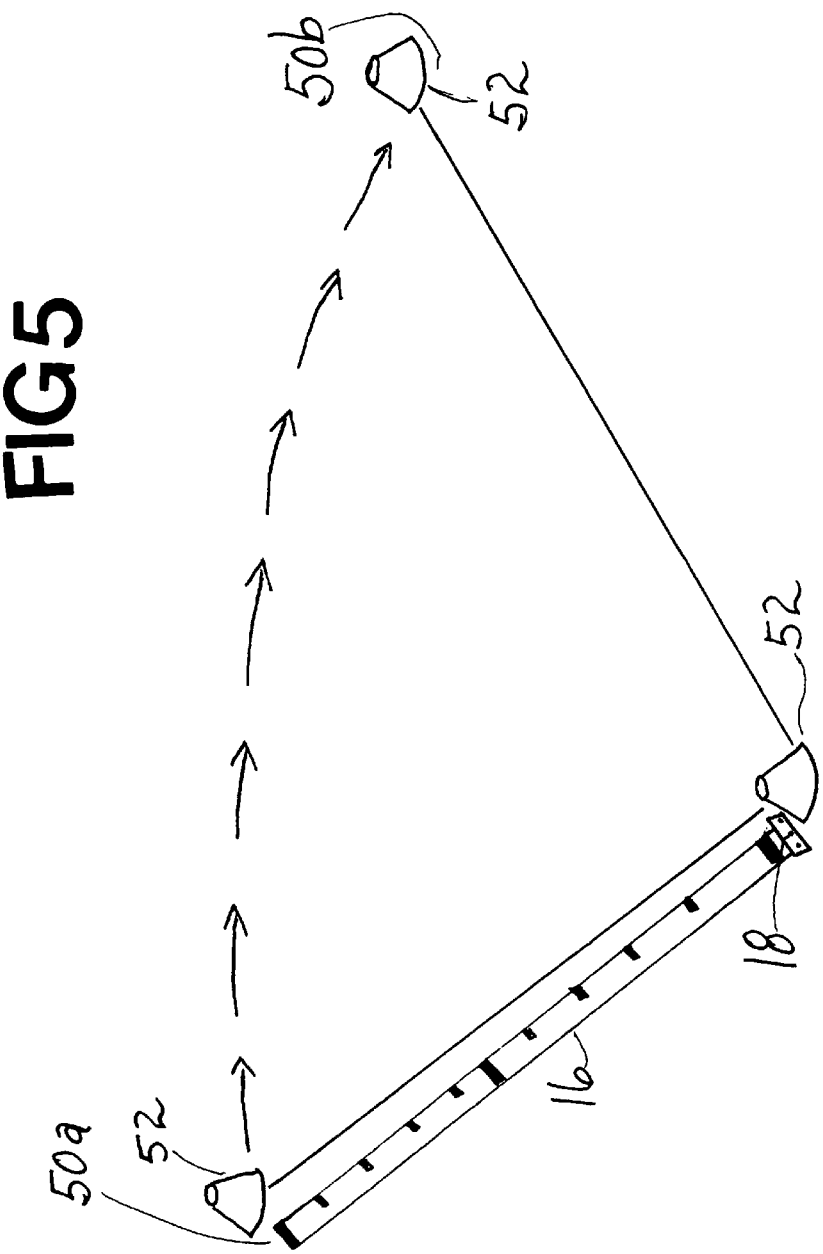

SPEED/AGILITY/QUICKNESS (SAQ) SKILL MEASUREMENT SET-UP ASSISTANT

BACKGROUND OF THE INVENTION

1. Field of the Invention

This invention relates to a system and method for measuring a plurality of skills of an athlete, wherein the system is comprised of: a means for discharging and collecting a distance measuring means; a distance measuring means for measuring a distance to be used in measuring a desired athletic skill, wherein the distance measuring means further comprises a plurality of incremental markings substantially located along a length of the distance measuring means; and a securing means operatively connected to one end of the distance measuring means for securing the distance measuring means.

2. Description of the Related Art

Prior to the present invention, as set forth in general terms above and more specifically below, it is known in sports and other competitive fields, that there are tangible and intangible characteristics of athletes that coaches and managers are looking for in order to build a championship team. For example, an intangible or not easily measured characteristic could be the athlete's instincts or overall awareness of what is occurring in the game and how the athlete reacts to events that are going on in the game. On the other hand, a tangible or easily measured characteristic could be considered to be the athlete's speed, agility and quickness. Consequently, a more advantageous system, then, would be provided if the athlete's tangible characteristics such as speed, agility, and quickness (SAQ) could be easily measured.

It is also known, that a variety of SAQ drills are utilized in analyzing the speed and agility of athletes for various sports such as American football, baseball, soccer, lacrosse, tennis and others. Some of these drills are heavily relied upon in "combines" for football, baseball, and other various sports. Combines are central staging areas where coaches, scouts, agents, and other sports-related personnel can get a comprehensive and thorough evaluation of the performance of athletes in an equal setting and under the same conditions. Many of these combines are conducted at venues where it takes two (2) or more people to set up the various drills that measure SAQ skills. Often times the SAQ drills are set up by just placing other training apparatus such as cones or flags by either eyesight or by "stepping off" the distance between training apparatus for training. These methods often result in inaccurate distances. Consequently, when at an official combine with distances measured off correctly, the athlete may find that his combine times are adversely different than his training times.

Finally, these drills can be utilized in training during the off-season for athletes to work on their skills and conditioning to maintain a competitive edge for when their season begins and to help prevent injuries that could occur when not doing the training properly. Also, these drills can be used during the season for warm-ups, conditioning and skills needed for on the field competitiveness. Therefore, a further advantageous system, then, would be provided if the SAQ skills measuring device would be used to quickly, easily and accurately set up the training drills by one (1) person.

It is further known to employ measuring tapes to measure distances. Therefore, an even further advantageous system, then, would be presented if the SAQ Setup measured distances in yards, with markings resembling that on a football field. Preferably, this device will have smaller markings for the one (1) yard increments and wider/bolder markings for the five (5) yard and ten (10) yard increments. The bolder ten (10) yard increments will be marked with the actual distance, i.e. 10, 20, 30, 40 yards, etc. Consequently, with these markings, it would make it easier for a trainer to set up drills for the athletes they are training, thereby allowing more time and more repetitions for the athletes to train.

Finally, it is known to employ a device that is capable of measuring only a single SAQ skill such as speed or agility. Therefore, a still further advantageous system, then, would be provided if a plurality of SAQ drills could be provided in one device such that the device can be quickly, easily and accurately set up by one (1) person.

It is apparent from the above that there exists a need in the art for a system and method that can be used to measure a plurality of SAQ skills of an athlete by using one device in a quick, easy and accurate manner but can be set up by one (1) person. It is a purpose of this invention to fulfill this and other needs in the art in a manner more apparent to the skilled artisan once given the following disclosure.

SUMMARY OF THE INVENTION

Generally speaking, an embodiment of this invention fulfills these needs by providing a system and method for measuring a plurality of skills of an athlete, wherein the system is comprised of: a means for discharging and collecting a distance measuring means; a distance measuring means for measuring a distance to be used in measuring a desired athletic skill, wherein the distance measuring means further comprises a plurality of incremental markings substantially located along a length of the distance measuring means; and a securing means operatively connected to one end of the distance measuring means for securing the distance measuring means.

In a further preferred embodiment, the means for discharging and collecting the distance measuring means is reel with a handle to wind up and unwind the distance measuring means. Also, the distance measuring means further includes smaller markings for the one (1) yard increments and wider/bolder markings for the five (5) yard and ten (10) yard increments. Also, the securing means further includes a bar with holes, wherein the holes can be used in conjunction with stakes or other similar devices to retain the measuring device in the ground or training surface and to allow the distance measuring means to pivot in order to form a variety of designs for use in measuring particular athletic skills.

The preferred embodiment, according to various embodiments of the present invention, offers the following advantages: ease of use; accuracy; the ability to set up multiple SAQ drills to train athletes in multiple athletic skills; and ease of set-up of multiple stations with one person. In fact, in many of the preferred embodiments, these factors of ease of use, accuracy, the testing of multiple athletic skills in one device and ease of set-up are optimized to an extent that is considerably higher than heretofore achieved in prior, known systems and methods for measuring a plurality of skills of an athlete.

The above and other features of the present invention, which will become more apparent as the description proceeds, are best understood by considering the following detailed description in conjunction with the accompanying drawings, wherein like characters represent like parts throughout the several views and in which:

BRIEF DESCRIPTION OF THE DRAWINGS

FIG. 4 is a schematic illustration of the SAQ set-up assistant being utilized to set up a ten (10) yard sprint set up; and FIG. 5 is a schematic illustration of the SAQ set-up assistant being utilized to set up a L-cone drill.

DETAILED DESCRIPTION OF THE INVENTION

Figure 1:
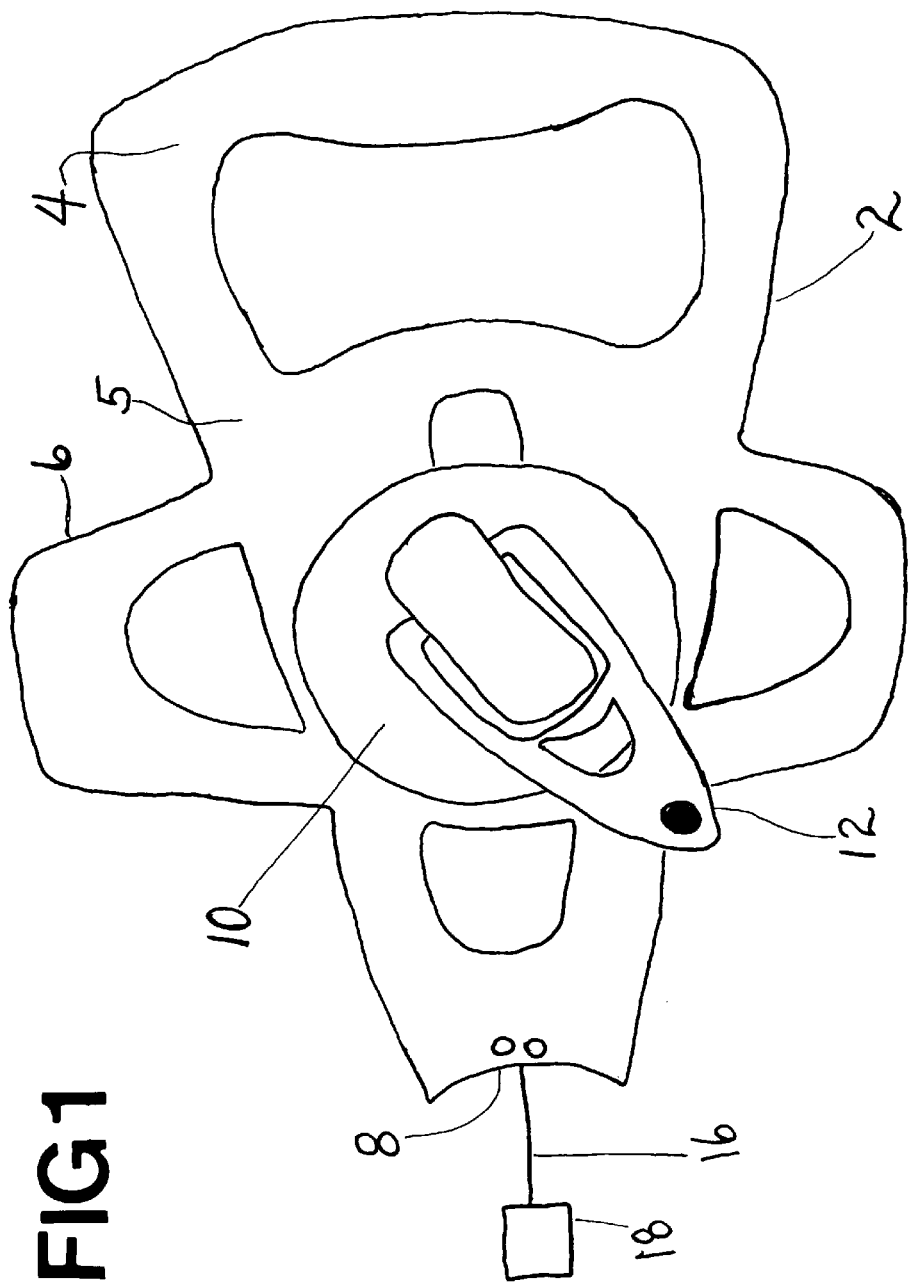
FIG. 1 is a schematic illustration of a speed, agility, and quickness (SAQ) skill measurement set-up assistant, according to one embodiment of the present invention.

With reference first to FIG. 1, there is illustrated one preferred embodiment for use of the concepts of this invention. As shown in FIG. 1, speed, agility and quickness (SAQ) skill measurement set-up assistant 2 is illustrated. Assistant 2 includes a plurality of handles 4, frame 5, frame supports 6, conventional tape measure guide rollers 8, tape measure reel 10, tape measure wind up/unwind handle 12, tape measure 16 and tape measure securing rod 18. It is to be understood that frame 5 and frame supports 6 may be constructed of any suitable, durable, and lightweight material. It is also to be understood that reel 10 should be constructed such that tape measure 16 can be either manually or automatically unwound from and/or re-wound upon reel 10. Also, tape measure 16 can be constructed of any suitable flexible, durable, and lightweight material. Finally, tape measure securing rod 18 can be constructed of any suitable flexible, durable, and lightweight material.

Figure 2:
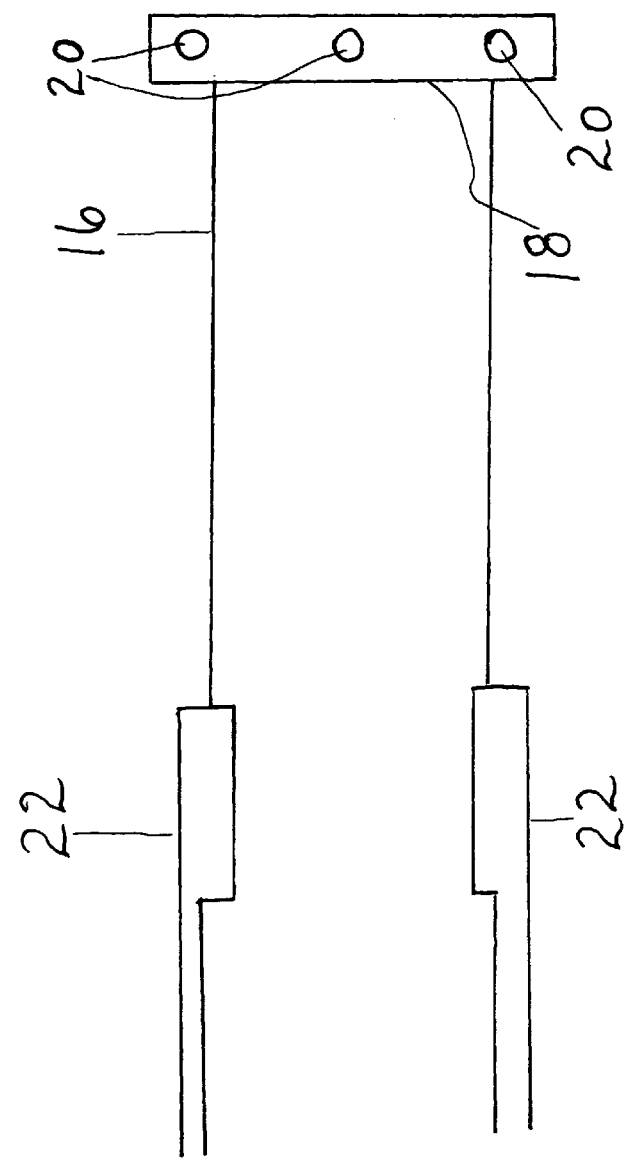
FIG. 2 is a schematic, top view illustration of the measuring tape being extended from the (SAQ) skill measurement set-up assistant.

With respect to FIG. 2, there is illustrated a top view of (SAQ) skill measurement set-up assistant 2. As can be seen in FIG. 2, tape measure 16 is unwound from tape measure reel 10 (FIG. 1) and interacts with tape measure guides 22 that are located along both sides of frame 5. Located along one end of tape measure 16 is tape measure securing rod 18. As can be seen in FIG. 2, tape measure securing rod includes holes 20 which allow spikes or other similar securing devices to be placed through holes 20 such that tape measure 16 can be secured to the gorund or whatever surface is being used to measure the athlete's SAQ.

Figure 3:
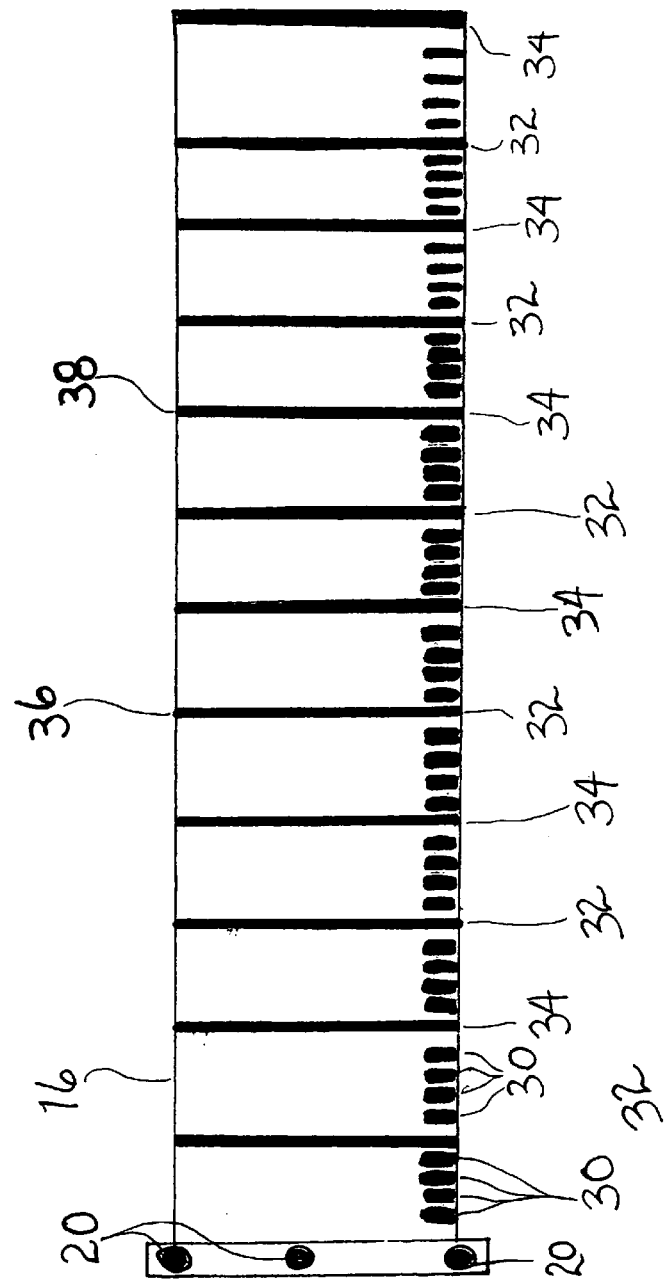
FIG. 3 is a schematic illustration of incremental markings that are placed upon the measuring tape for the one (1) yard increments and wider/bolder markings for the five (5) yard and ten (10) yard increments.

With respect to FIG. 3, there are illustrated incremental markings located along a length of tape measure 16. In particular, smaller markings 30 denote one (1) yard increments. Wider/bolder markings 32 denote five (5) yard increments and markings 34 denote ten (10) yard increments. As can be seen further, markings 36 and 38 can be placed along the length of tape measure 16 in order to denote 25 and 40 yard lengths, respectively. It is to be understood that any combination of increments including one-hundred (100) yard increments can be placed along tape measure 16 but that can be left up to the user.

With respect to FIG. 4, there is illustrated an example of a ten (10) yard sprint setup. As shown in FIG. 4, tape measure securing rod 18 is staked down at two outer holes 20 (FIG. 2) with conventional stakes (not shown). Tape measure 16 is rolled out to the ten (10) yard mark. A cone 40 or other similar marking device can be placed at the (10) yard mark to denote the end of the sprint drill. It is to be understood that cones or other similar marking devices can be placed at the beginning of the set up to mark the start of the drill. Also, a cone or other similar marking device can be placed along the halfway distance to denote that the mid-point distance of the drill. It is further to be understood that if it is desired to have two (2) lanes, one needs to simply drop a cone or other similar marking device on each side of measuring tape 16 to allow for two (2) athletes to run side-by-side in a competitive sprint. Finally, it is to be understood that one can place cones or other similar marking devices at every ten (10) yard increment in order to set up forty (40) yard sprint, sixty (60) yard, or one-hundred (100) yard sprint.

With respect to FIG. 5, there is illustrated an L-Cone drill setup. As shown in FIG. 5, tape measure 16 is unrolled to the desired length 50a and tape measure securing rod 18 is secured at middle hole 20 (FIG. 2) by conventional stakes (not shown). A cone 52 or other similar marking device is placed adjacent to staked tape measure securing rod 18. Tape measure 16 is then simply pivoted around staked tape measure securing rod 18 in either the right or left direction and extended along length 50b in order to form an "L" shape or right angle. It is to be understood that in order to set up multiple stations for this drill, simply repeat the process.

It is to be understood that (SAQ) skill measurement set-up assistant 2 may also include a storage bag (not shown) wherein marking items such as cones, bases, flags or other suitable marking devices and hold down stakes can be stored for usage in marking desired distances that have been measured off by skill measurement set-up assistant 2. Also, because of the lightweight material and the ease of use, this device can be used in any location, field, asphalt lot, gymnasium, as long as there is a suitable amount of space to run drills.

Finally, because many of these SAQ drills are sport specific, the skill measurement set-up assistant 2 may be utilized in order to measure various SAQ skills desired for other sports, such as, baseball. It is well known that some of the desired SAQ skills for baseball players are the ability to quickly run a sixty (60) yard dash, the ability to move quickly from one base to another base, and the ability to throw a baseball for distance and to throw for accuracy. With this in mind, skill measurement set-up assistant 2 can be set-up to measure these desired SAQ skills, as well as others. For example, skill measurement set-up assistant 2 can be set up, similar to the ten (10) yard sprint set-up illustrated in FIG. 4, so as to mimic a ninety (90) foot distance or the distance between the bases on a baseball field.

The foregoing disclosure of the exemplary embodiments has been presented for purposes of illustration and description. It is not intended to be exhaustive or to limit the invention to the precise forms disclosed. Many variations and modifications of the embodiments described herein will be apparent to one of ordinary skill in the art, in light of the above disclosure.

Further, in describing representative embodiments, the specification may have presented methods and/or processes as a particular sequence of steps. However, to the extent that the methods or processes do not rely on the particular order of steps set forth herein, the methods or processes should not be limited to the particular sequence of steps described. As one of ordinary skill in the art would appreciate, other sequences of steps may be possible. Therefore, the particular order of the steps set forth in the specification should not be construed as limitations on the claims.

Once given the above disclosure, many other features, modifications or improvements will become apparent to the skilled artisan. Such features, modifications or improvements are, therefore, considered to be a part of this invention, the scope of which is to be determined by the following claims.

The invention claimed is:

1. A system discharging a tape measure to assist in setting up a plurality of Speed, Agility and Quickness drills for training and evaluating athletes abilities, wherein the system consists of:

a means for discharging a tape measure to measure the distances for various athletic skills and drills assessments;

a tape measure made of a vinyl coated, water resistant material; wherein the tape measure is three inches wide for the ease of use and visibility at longer distances and from various viewing angles; wherein the tape measure includes a start line and measuring markings at one yard increments, wherein the five yard increment markings are larger and bolder than the one yard increments and the tape measure has various lengths up to one hundred yards;

a securing block operatively connected at a leading edge of the tape measure, said securing block made of a hardened material and including three holes in a single line to insert securing means; wherein the two outer holes are used when the tape measure is discharged at longer distances for athletic speed assessment drills and the center hole is utilized as a pivot point for setting up multi-point athletic agility and quickness assessment drills; and wherein the ten yard increment marking has a hole for receiving a securing rod to mark the ten yard increment assessments of the athletes speed.

2. The system, as in claim 1, wherein the means for discharging and collecting a distance measuring means is further comprised of:

a reel operatively connected to the means for discharging and collecting a distance measuring means and the distance measuring means; and a handle operatively connected to the reel for discharging and collecting the distance measuring means.

3. The system, as in claim 1, wherein the distance measuring means is further comprised of:

a securing rod operatively connected to one end of the distance measuring means.

4. The system, as in claim 3, wherein the securing rod is further comprised of:

a plurality of holes located along a length of the securing rod.

5. The system, as in claim 1, wherein the distance measuring means is further comprised of:

a plurality of incremental markings located substantially along a length of the distance measuring means.

6. The system, as in claim 5, wherein the plurality of incremental markings are further comprised of:

one (1) yard increments.

7. The system, as in claim 5, wherein the plurality of incremental markings are further comprised of:

five (5) yard increments.

8. The system, as in claim 5, wherein the plurality of incremental markings are further comprised of:

ten (10) yard increments.

9. The system, as in claim 5, wherein the plurality of incremental markings are further comprised of:

twenty-five (25) yard increments.

10. The system, as in claim 5, wherein the plurality of incremental markings are further comprised of:

forty (40) yard increments.

11. The system, as in claim 5, wherein the plurality of incremental markings are further comprised of:

one-hundred (100) yard increments.

12. A method for providing a measurement of a plurality of athletic skills and drills by an athletic trainer, coach, athlete college or professional scout, etc in order to assess an athlete's performance, wherein the method is comprised of the steps of:

discharging a length of a distance measuring means that corresponds to a desired speed, agility or quickness skill to be measured; wherein the distance measuring means consists of a means for discharging a tape measure to measure the distances for various athletic skills and drills assessments; a tape measure made of a vinyl coated, water resistant material; wherein the tape measure is three inches wide for the ease of use and visibility at longer distances and from various viewing angles; wherein the tape measure includes a start line and measuring markings at one yard increments, wherein the five yard increment markings are larger and bolder than the one yard increments and the tape measure has various lengths up to one hundred yards; and a securing block operatively connected at a leading edge of the tape measure, said securing block made of a hardened material and including three holes in a single line to insert securing means; wherein the two outer holes are used when the tape measure is discharged at longer distances for athletic speed assessment drills and the center hole is utilized as a pivot point for setting up multi-point athletic agility and quickness assessment drills;

securing the distance measuring means at its leading edge;

marking the other end of the distance measuring means; and determining and evaluating a desired skill of an athlete.

13. The method, as in claim 12, wherein the desired skill to be measured is a ten (10) yard sprint.

14. The method, as in claim 13, wherein the method is further comprised of:

unrolling at least ten (10) yards of the distance measuring means;

securing the distance measuring means with a securing means; and marking the other end of the distance measuring means thorough the use of a marking means.

15. The method, as in claim 12, wherein the desired skill to be measured is a L-cone drill.

16. The method, as in claim 15, wherein the method is further comprised of:

unrolling a first distance of the distance measuring means;

securing the distance measuring means at one end;

pivoting the unrolled distance measuring means around the secured end of the distance measuring means;

extending out the distance measuring means to a second distance so that a first end of the second distance is secured and so that the second distance is substantially equal to the first distance and the second distance is substantially located ninety degrees with respect to the first distance; and marking the other end of the second distance.

* * * * *